Figure 1:
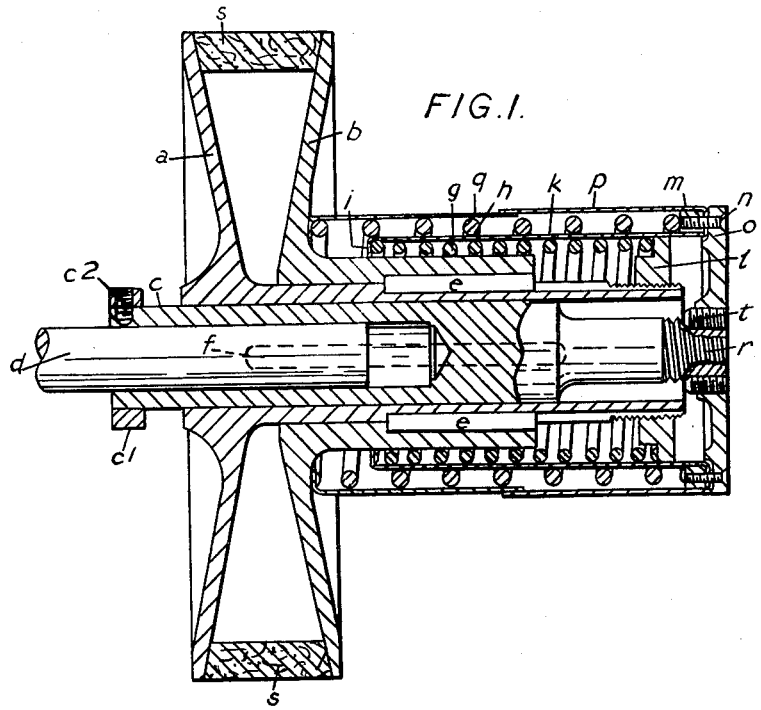

Sept. 23, 1952      J. MITCHELL      2,611,277
EXPANSIBLE PULLEY

Filed April 24, 1950      3 Sheets-Sheet 1

Inventor:-
James Mitchell,
By Smith, Michael & Gardiner.
Attorneys.

Sept. 23, 1952 J. MITCHELL 2,611,277
EXPANSIBLE PULLEY
Filed April 24, 1950 3 Sheets-Sheet 3

Inventor:-
James Mitchell,
By Smith, Michael and Gardiner,
Attorneys.

Patented Sept. 23, 1952

2,611,277

UNITED STATES PATENT OFFICE 2,611,277

EXPANSIBLE PULLEY

James Mitchell, Marfleet, Hull, England, assignor to J. H. Fenner & Company Limited, Marfleet, Hull, England, a British company Application April 24, 1950, Serial No. 157,809
In Great Britain April 25, 1949

4 Claims. (Cl. 74—230.17)

This invention is concerned with variable speed belt transmission mechanism of the type in which pulleys are used having conical flanges, which flanges can be moved apart against spring action or allowed to come nearer together, in order to vary the effective diameter of the pulley for transmission purposes. The flanges are pressed toward one another by powerful springs, and the speed variation between driving and driven shafts is obtained by moving the axis of one pulley towards or away from that of the other, or by the use of a jockey pulley altering the run of the belt. One convenient arrangement is that in which the expanding pulley is on the shaft of an electric motor mounted to slide on a base and to be adjusted by a screw and handwheel. In this case, if the motor carrying the expansible pulley is moved further away from the driven shaft the pull of the belt forces apart the flanges of the pulley on the driving shaft thus reducing the effective diameter of the driving pulley and so reducing the speed of power transmission. Adjusting the driving motor nearer to the driven shaft gives the reverse effect allowing the flanges of the pulley to move together and making the pulley effectively one of larger diameter so as to increase the driving speed.

The driving belt is either V-shape in transverse cross section or has its sides wedge-shaped so as to co-operate effectively with the conical flanges of the pulley. The expanding pulley can be either on the driving or on the driven shaft, and its use on the driving shaft has only been mentioned as being generally the most convenient arrangement. The driven pulley may be a plain or grooved pulley of fixed diameter or may be itself adjustable in diameter, if required.

As a strong spring must be used for pressing the flanges of the double cone pulley together, the spring has generally had to be a long one in order that it may sustain the required side pressure, particularly when the flanges of the pulley are closed together and when the spring is therefore most relaxed. This has necessitated the use of abnormally long springs with long bosses or sleeves which tend to make the variable speed unit large and cumbersome. If separate springs are used, one for each flange, careful adjustment of each spring is necessary to equalize loading so that the belt may remain centrally disposed in relation to its line of travel as the pulley is expanded and contracted. The springs may need readjusting after being in use for a time in order that they may be equally loaded while the belt maintains its proper line of travel throughout the range of adjustment.

It is the object of the present invention to provide a form of expanding belt pulley with automatic spring control which will be easy to set initially or to adjust when required so as to maintain the proper relative position of the flanges of the pulley under all conditions. The expanding pulley may be a single pulley with two opposed flanges or a multiple pulley with two or more pairs of flanges.

Figure 3:
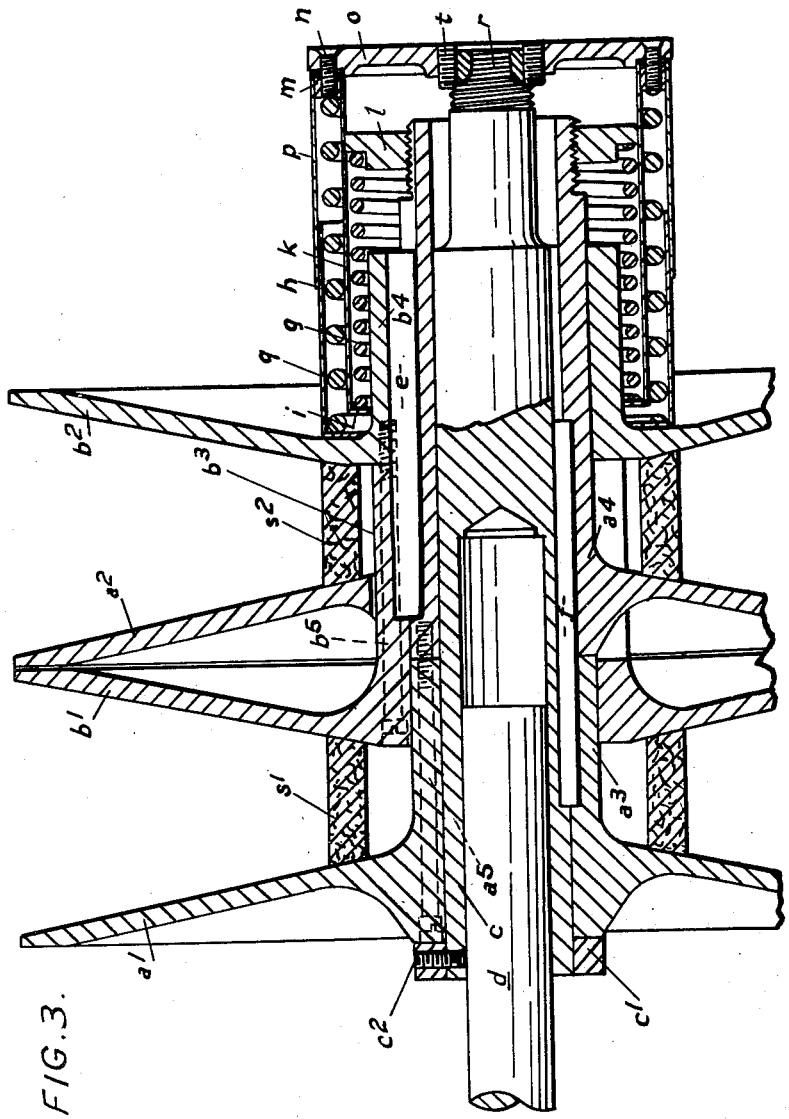
Figure 4:
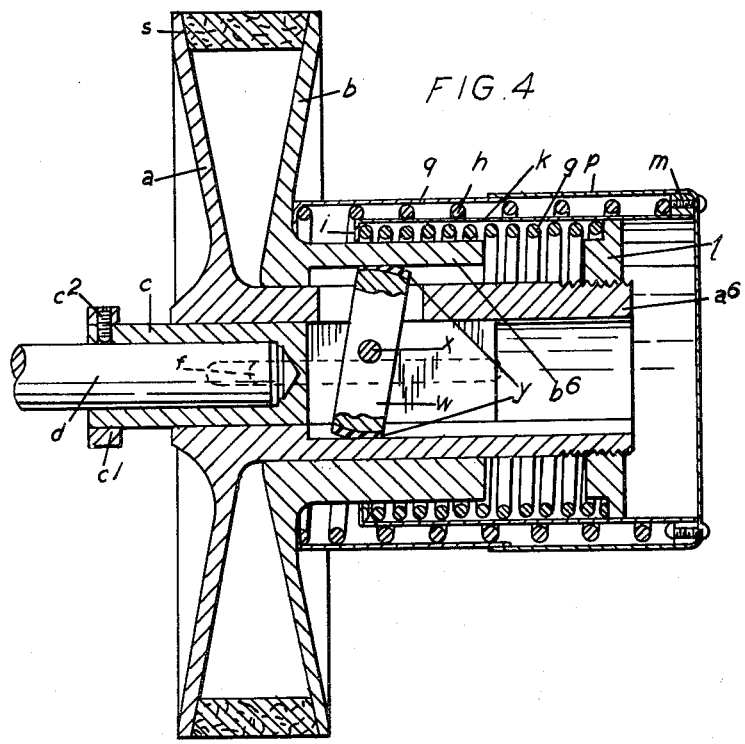
Figure 5:
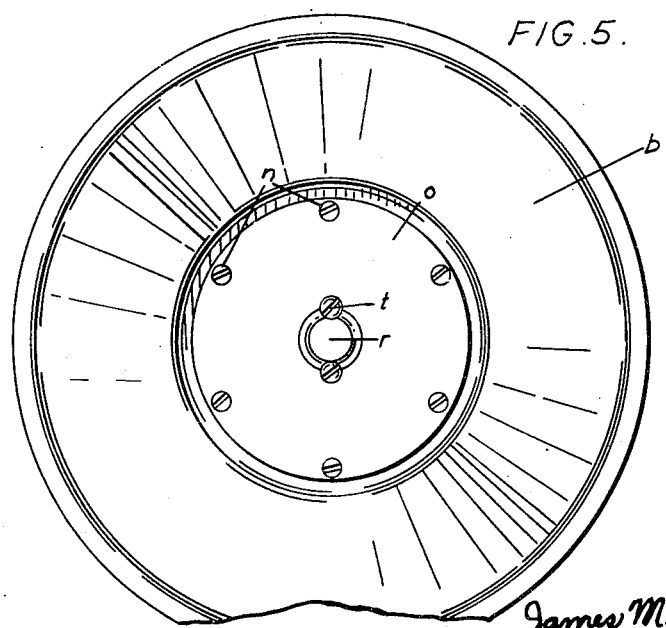

The invention is illustrated by way of example in the accompanying drawings wherein Figures 1, 2, 3 and 4 are longitudinal sectional views through shafts and pulleys showing alternative ways in which the invention can be applied in practice. Figure 5 is an end view of Figure 1.

Referring first to Figure 1, $a$ and $b$ are the conical faces of a pulley, the hub portions of which fit slidably one on another, and are supported by sleeve $c$ upon shaft $d$, which latter may be, for example, the spindle of a motor. Sliding keys $e$ transmit the torque between the hub portions of cones $a$ and $b$, and sliding keys $f$ transmit the torque between the hub of cone $a$ and sleeve $c$, this latter being keyed or otherwise fixed on the spindle $d$. The V-shaped belt is marked $s$ and is shown at its outermost position when the cones $a$ and $b$ are in their position of nearest approach to one another. A collar $c'$ fixed in position by a set screw $c^2$ limits the outward travel of cone $a$ on sleeve $c$.

The cones $a$ and $b$ are drawn toward one another by springs $g$ and $h$, one outside the other, the spring $g$ embracing the hub portion of cone $b$, and being separated from the other spring $h$ by the cylindrical portion of the equalizer $k$. This equalizer has one end turned inwardly as at $i$ to form an abutment for one end of spring $g$, while the other end of this spring bears against the shoulder of a member $l$ formed as a nut for adjustment on the threaded end of the hub portion of cone $a$. The equalizer $k$ is doubled back on itself at the right hand end, with a metal ring $m$ secured in its bend to form on the one hand an abutment or shoulder for the right hand end of spring $h$ to bear against, and on the other hand to receive screws $n$ by which an end plate or cover $o$ can be attached. The springs $g$ and $h$ are enclosed in a telescoping casing consisting of the parts $p$ and $q$, of which part $p$ may be integral with the equalizer $k$, while part $q$ has its left hand end inwardly turned to act as an abutment or shoulder for the left hand end of spring $h$ where it exerts its pressure on cone $b$.

The cover plate $o$ screws upon the threaded end $r$ of the sleeve $c$ and is locked in its position of adjustment by grub screws $t$ engaging partly in holes in the cover plate o and partly in grooves in the threaded end r. When the cover plate is so applied, it anchors the equalizer k with reference to sleeve c so as to insure that the cones a and b move equally towards or away from a median plane between them, as the pulley expands and contracts.

In setting up this pulley, the cover plate o is left off, while the springs g and h are assembled with the equalizer k between them, and the telescoping casing p, c around them. The springs are pre-loaded by screwing up the nut l on the end of the hub portion of cone a, thus applying pressure to spring g and through the equalizer k to spring h and the cone b. At this stage the springs g and h are acting in series and must therefore be equally loaded. The springs are equally rated for expansion and contraction under load. The cover plate o is now applied and screwed on the threaded end r of sleeve c until it just contacts with the end of the equalizer k. The grub screws t are then inserted to lock the cover plate against rotation, and screws n are inserted to attach the cover plate o to the ring m in the end of the equalizer k. The parts are now locked in their position of adjustment, and should continue to permit equal movements of the cones a and b with respect to a median plane between them, as the pulleys are adjusted toward or away from one another, although now the spring h acts directly between cover plate o and sleeve c on the one hand, and the back of cone b on the other hand, and spring g acts directly between sleeve c and the hub of cone a. If the parts are separated at any time, for re-tensioning the springs by nut l for example, or for replacing one or both of the springs g and h, the same procedure should be followed to insure equal loading of the two springs through the equalizer k. The cones a and b with their sliding hub portions, have been described as working on a sleeve c which is itself fixed on a shaft or spindle d, because it is convenient to make the expanding pulley with its sleeve c as a unit for mounting on any shaft. The cones a and b could slide directly on shaft d however if preferred in any case.

Figure 2:
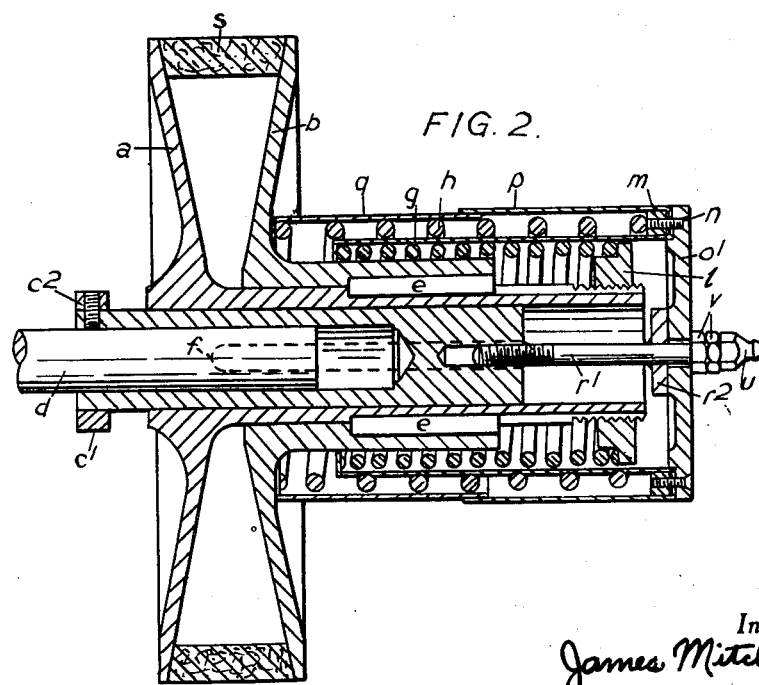

Figure 2 shows a modified construction in which provision is made for internal lubrication. The parts which are the same as in Figure 1 are lettered to correspond with that figure. The principal difference is that the threaded end r of sleeve c is omitted, and instead of this a tubular stem r' is fitted to the end of sleeve c. This stem carries a collar r² against which cover plate o' is located by nuts v, while a lubrication nipple u on the end of tubular stem r' enables lubricant to be introduced, which passes by suitable internal oil ducts to the working faces of the hubs of cones a and b and the sleeve c.

Figure 3 shows how a multiple belt pulley can be constructed on the same principles as the single one. In this case are shown two left-hand cones a' and a², and two right-hand cones b' and b², and two V-belts s' and s², the cones being shown separated to their maximum extent to give pulleys of the smallest effective diameters. The springs g and h, the equalizer k, and their method of mounting and adjustment, are the same as in Figure 1 and should require no further description. The cones a' and a² have their hubs a³ and a⁴ abutting against one another, and keyed to the sleeve c sliding keys f; the two hubs being locked together by long bolts a⁵ extending through hub a³ into hub a⁴. Similarly, the hub b³ of cone b' has extensions passing through slots in cone a² and abutting against the hub b⁴ of cone b², these two hubs being locked together by a long bolt b⁵. The hubs b³ and b⁴ are keyed to hubs a³ and a⁴ by sliding keys e. Under the equalized pressures of springs g and h, the cones a' and b' move apart or nearer together, simultaneously with the cones a² and b², as the driving and driven shafts are moved further apart or nearer together for varying the transmission ratio of the power drive through belts s' and s². Of course, three or more pairs of cones for driving through three or more belts can be interconnected for simultaneous operation on the same principle as is illustrated for the two pairs of cones in Figure 3.

The cover plate o is not an essential feature of the invention, and the equalizer k can be left free to transmit the pressure from one spring to the other. For example, Figure 4 shows an arrangement like that of Figure 1 except that the parts n, o, r and t are omitted, and the equal simultaneous movements of cones a and b towards and away from a median plane between them are insured by introducing a rocker w acting as a link between them. The hub portion a⁶ of the cone a has a slot in it through which the rocker w projects. This rocker is pivoted at x in the end portion of the sleeve member c, and has its ends curved and provided with elastic treads v of rubber or the like, by which these ends bear respectively on the inner surface of hub portion a⁶ and the inner surface of hub portion b⁶. This device is only shown as one convenient form of linkage between the hubs of cones a and b, and any equivalent linkage or balancing gearing serving the same purpose can be used, such for example as a soft-tired disc or a gear wheel or toothed segments engaging with gear teeth in the hubs a⁶ and b⁶ respectively.

It will be realised that, in each of the constructions described, the two springs g and h secure the advantages of a spring of double their length in so far as equal resilience and low rating per unit of compression are concerned, while the equalizer mechanism when used as described insures that the two springs are always equally loaded, and that the run of the belt is maintained whenever the effective pulley diameter is varied by relative displacement between the driving and driven shafts.

I claim:

1. Expansible pulley for use in variable speed transmission of power comprising a pair of conical flanges having hub portions adapted to slide one upon the other, a pair of helical springs acting in series and equally rated for expansion and contraction under load, one of said springs being disposed around the other, an equalizer cylinder disposed between said springs, said equalizer cylinder having one of its ends inwardly directed and the other outwardly directed, and a collar adjustably mounted on the hub portion of one of said conical flanges and adapted to take the thrust of the inner one of said helical springs between the inwardly directed end of said equalizer and the hub portion of one of said conical flanges, while the outer one of said helical springs is so disposed as to exert its thrust between the other one of said conical flanges and the outwardly directed end of said equalizer.

2. Expansible pulley for use in variable speed transmission of power comprising a pair of conical flanges having hub portions adapted to slide one upon the other, a pair of helical springs one disposed around the other, an equalizer cylinder disposed between said springs, said equalizer cylinder having one of its ends inwardly directed and the other outwardly directed, a collar adjustably mounted on the hub portion of one of said conical flanges and adapted to take the thrust of the inner one of said helical springs between the inwardly directed end of said equalizer and the hub portion of one of said conical flanges, while the outer one of said helical springs is so disposed as to exert its thrust between the other one of said conical flanges and the outwardly directed end of said equalizer, in combination with a sleeve member slidably mounted within the hub portions of said conical flanges, means for keying together such sleeve member and said hub portions while permitting relative axial movements between them, and an end cover with means for adjustably fixing it at one end of said sleeve member, and attaching it to said equalizer after said helical springs have been subjected to compression.

3. Expansible pulley for use in variable speed transmission of power comprising a plurality of pairs of conical flanges disposed in right and left opposed relation, and having hub portions adapted to slide axially upon and within one another, means connecting together the hub portions of said right hand flanges and said left hand flanges respectively, for simultaneous axial movements one upon the other, means for keying together said relatively movable hub portions in pairs, while permitting of their axial movements, a pair of helical springs one disposed around the other, an equalizer cylinder disposed between said springs, said equalizer cylinder having one of its ends inwardly directed and the other outwardly directed, a collar adjustably mounted upon the hub portion of one of said conical flanges and adapted to take the thrust of one of said helical springs between the inwardly directed end of said equalizer and the hub portion of the conical flange on which said collar is mounted, while the other said helical springs transmits its thrust between the outwardly directed end of said equalizer and an opposing conical flange member of said expansible pulley, in combination with a sleeve member slidably mounted within the inner hub portions of said conical flanges, means for keying said sleeve member to said inner hub portions of said conical flanges, and an end cover with means for adjustably fixing it at one end of said sleeve member and attaching it to said equalizer after said helical springs have been subjected to compression.

4. Expansible pulley for use in variable speed transmission of power comprising a pair of conical flanges with hub portions adapted to slide one upon the other, means for keying said hub portions together for simultaneous rotation, a pair of helical springs one surrounding the other, an equalizer between said springs having one end inwardly directed and the other end outwardly directed and adapted to form abutments for one end of each of said springs, a collar adjustably mounted on the hub portion of one of said conical flanges and adapted to apply compression stresses directly to one of said springs and indirectly to the other of said springs through said equalizer while the inner end of the outer of said springs transmits a thrust upon the back of one of said conical flanges, in combination with an axial support for said hub portions and means for affixing said equalizer to said axial support when said springs are under compression.

JAMES MITCHELL.

REFERENCES CITED

The following references are of record in the file of this patent:

UNITED STATES PATENTS

| Number | Name | Date |
| --- | --- | --- |
| 1,825,093 | Sansburn | Sept. 29, 1931 |
| 2,195,411 | Lewellen | Jan. 2, 1940 |
| 2,203,149 | Hoover | June 4, 1940 |
| 2,260,795 | Burns | Oct. 28, 1941 |
| 2,262,678 | Heyer | Nov. 11, 1941 |
| 2,313,436 | Hennessy | Mar. 9, 1943 |
| 2,475,955 | Gerbing | July 12, 1949 |

FOREIGN PATENTS

| Number | Country | Date |
| --- | --- | --- |
| 407,850 | France | Mar. 11, 1910 |